(No Model.) 4 Sheets—Sheet 1.

S. G. RANDALL.
AUTOMATIC GAVELING RAKE FOR HARVESTERS.

No. 290,801. Patented Dec. 25, 1883.

WITNESSES
Wm A. Skinkle
Harry King

INVENTOR
Silas G. Randall
By his Attorneys
Baldwin, Hopkins & Peyton

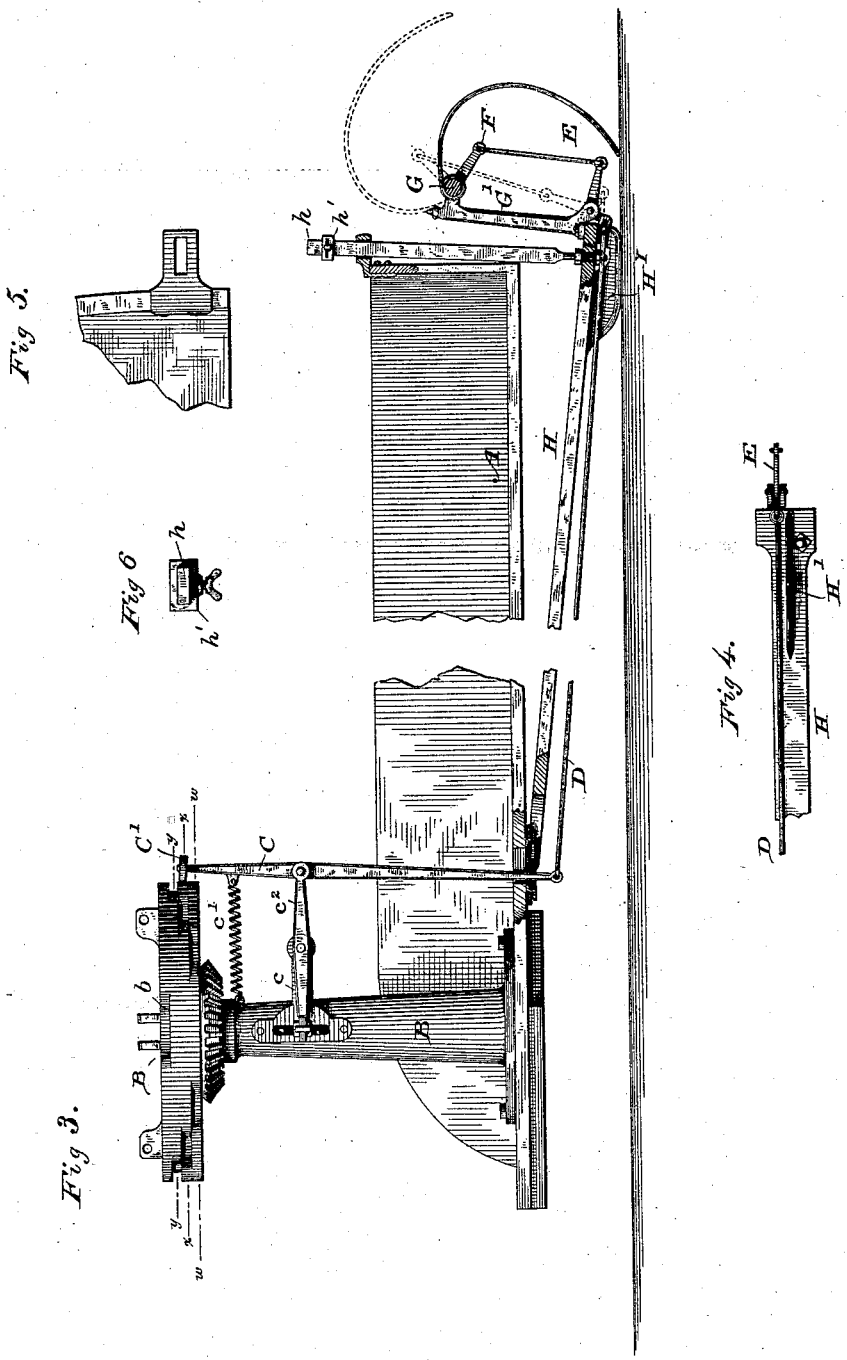

(No Model.) 4 Sheets—Sheet 3.
S. G. RANDALL.
AUTOMATIC GAVELING RAKE FOR HARVESTERS.
No. 290,801. Patented Dec. 25, 1883.
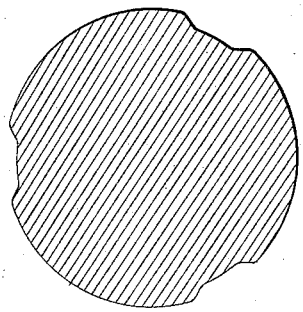
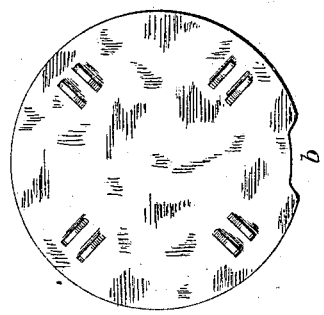
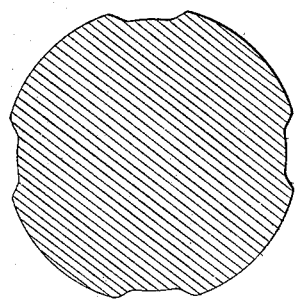
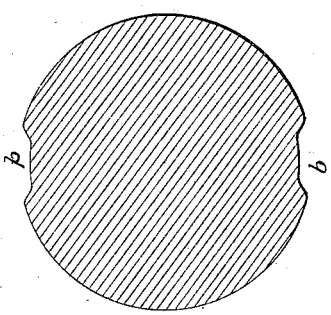
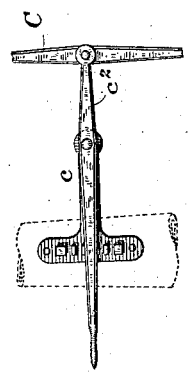
WITNESSES
Wm A. Skinkle.
Harry King.
INVENTOR
Silas G. Randall
By his Attorneys
Baldwin, Hopkins & Peyton.

(No Model.) 4 Sheets—Sheet 4.
S. G. RANDALL.
AUTOMATIC GAVELING RAKE FOR HARVESTERS.
No. 290,801. Patented Dec. 25, 1883.
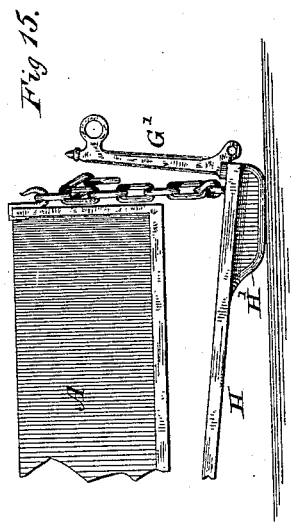
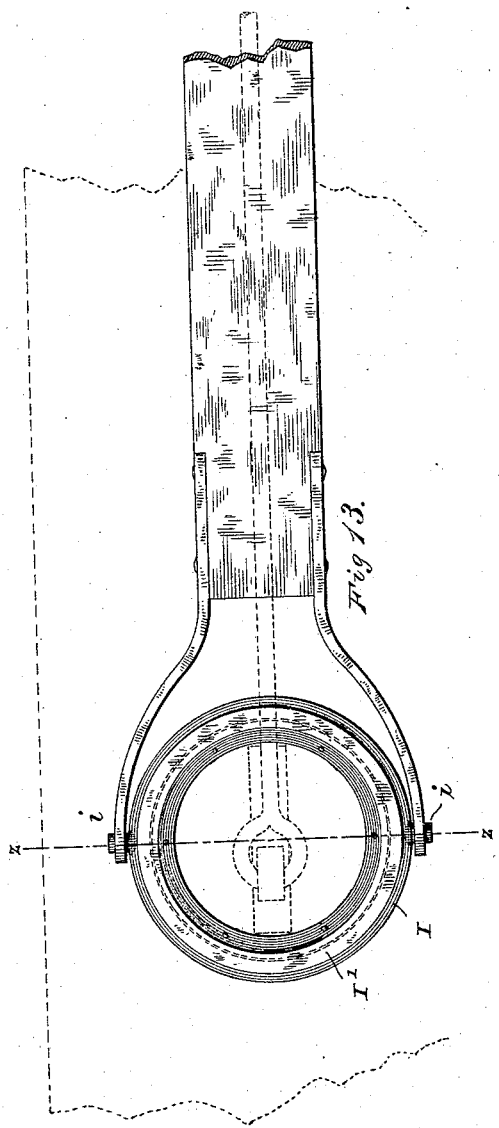
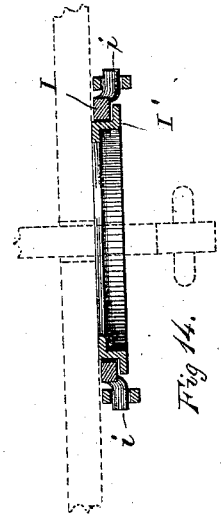
WITNESSES
Wm A. Skinkle
Harry King
INVENTOR
Silas G. Randall,
By his Attorneys
Baldwin, Hopkins & Peyton.

what # UNITED STATES PATENT OFFICE.

SILAS G. RANDALL, OF GREENE, NEW YORK.

AUTOMATIC GAVELING-RAKE FOR HARVESTERS.

SPECIFICATION forming part of Letters Patent No. 290,801, dated December 25, 1883.

Application filed April 27, 1883. (No model.)

*To all whom it may concern:*

Be it known that I, SILAS G. RANDALL, of Greene, in the county of Chenango and State of New York, have invented certain new and useful Improvements in Harvesters, of which the following is a specification.

In harvesting grain by the ordinary reaping or harvesting machines, the cut grain is usually delivered from the platform of the machine in a wide swath, which is subsequently raked up by hand into a gavel suitable for binding. The object of my invention is to bunch the grain thus delivered into gavels by means of a gaveling-rake automatically actuated by the mechanism of the harvester. For this purpose I provide a light gaveling-rake at the rear of the grain-platform and operate it by the sweep-rake mechanism.

Figure 1:
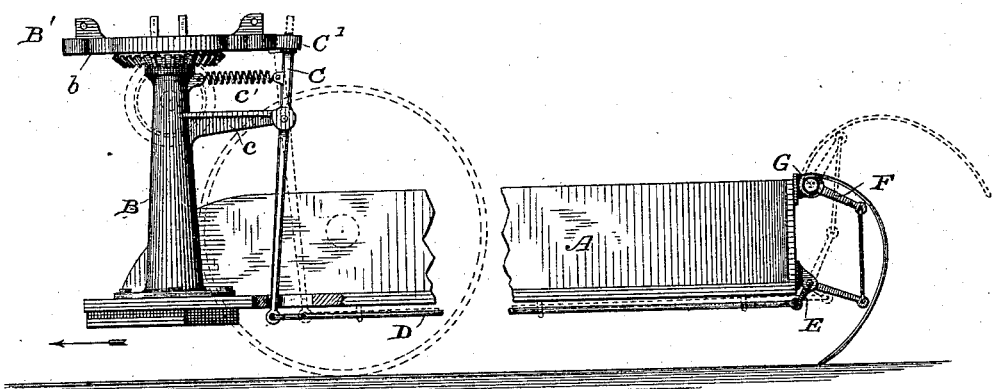
Figure 2:
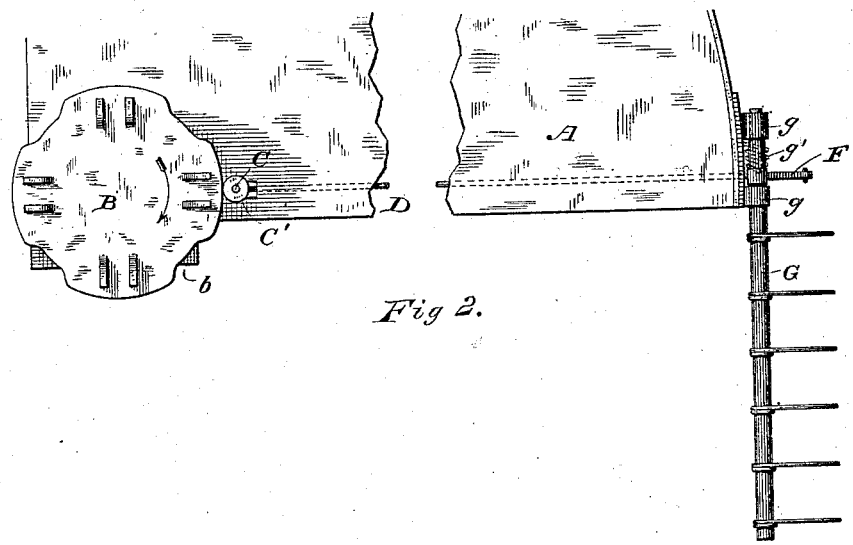

In the accompanying drawings, illustrating my invention, Figure 1 is a side elevation, representing parts of a harvesting-machine with my improvements applied thereto. Fig. 2 is a plan view of the same. Fig. 3 is an elevation similar to Fig. 1, showing a different construction. Figs. 4, 5, and 6 are detail views. Fig. 7 is a detail sectional view on the line $w$ $w$ of Fig. 3; Fig. 8, a similar view on the line $x$ $x$; Fig. 9, a similar view on the line $y$ $y$; Fig. 10, a top view of the rake-disk or crown-plate. Figs. 11 and 12 are detail views of devices for adjusting the lever which operates the gaveling-rake. Figs. 13 and 14 are detail views, showing the connection of the drag-bar which carries the gaveling-rake with the grain-platform; and Fig. 15 is a detail view of a means for raising and lowering the rear end of said bar relatively to the grain-platform.

In Figs. 1 and 3 the grain-platform A is shown as carrying the rake-post B on its inner front corner; but it is immaterial, so far as my invention is concerned, broadly, whether the rake-post be carried on the platform or not.

Referring to Fig. 1, which shows the simplest form of my invention, the crown plate or disk B', on which the sweep-rakes are pivoted, is rotated in any usual way, and is provided with four cam-recesses, $b$, at equal distances around its edge. A lever, C, pivoted in the end of an arm, $c$, projecting from the rake-post beneath the crown-plate, carries a roller, C', which runs on the cam face or edge of the rotating crown-plate, and is normally drawn against it by a spring, $c'$. The lower end of the lever C passes through the grain-platform, and is pivoted to a horizontal rod, D, suspended in sustaining-eyes on the under side of the platform, and pivotally connected at its rear end to a crank, E, carried on the rear of the grain-platform. The other arm of the crank E is connected by a link with a crank-arm, F, on the end of the gaveling-rake head G. The rake-head is supported in horizontal bearings $g$ $g$ on the end of the grain-platform, as clearly illustrated. A coiled spring, $g'$, placed on the rake-head between its bearings, tends normally to throw up the rake-teeth, so that whenever any of the connections at either end of the rod D or the crank E are uncoupled the rake-teeth will be elevated. As the crown-plate rotates when the roller $c$ is traveling upon the outer cam-faces, the gaveling-rake will be held down, as indicated by the full lines in the drawings. When the roller, however, is drawn into the cam-recesses by the spring $c'$, the rake will be thrown up, as indicated in dotted lines. The rake will alternately be thrown into and out of action four times in each revolution of the plate, and the grain, which is delivered endwise in a swath from the grain-platform, will be bunched into gavels of suitable size. Of course the crown-plate may be provided with three, two, or one cam-recess, instead of four, as indicated in the drawings.

In Fig. 3 I have illustrated a somewhat different organization for carrying out the same purpose, but one which I deem preferable, on account of its adjustability and of the freedom of the grain-platform to rise and fall without affecting the gaveling-rake. In this organization the gaveling-rake is carried in an upright standard, G', on the end of a drag-bar, H. Aside from this variation, the details of construction and operation of the rake are like those described in connection with Fig. 1. The drag-bar H is provided with a shoe or runner, H', which sustains its rear end a short distance above the ground, and is connected to the platform of the machine at its forward end by a joint, which leaves it free to rise and fall independently and swing laterally. It is guided vertically, however, and held against any lateral play, other than mere vibration, by an upright guide-rod, *h*, which passes through an eye on the grain-platform. An adjustable stop, *h'*, is placed on the guide-rod *h*, above the eye through which the guide-rod plays. By setting the stop as shown in the drawings, the grain-platform may be raised and lowered without affecting the drag-bar which carries the gaveling-rake, and the drag-bar may in like manner rise and fall irrespective of the grain-platform. When it is desired, however, to lift the gaveling-rake out of contact with the ground, the drag-bar is raised up against the bottom of the grain-platform and supported in that position by the stop *h'*; or, if preferred, a chain and hook may be employed, as illustrated in Fig. 15.

The connection of the drag-bar with the grain-platform is illustrated in Figs. 13 and 14, from which it will be seen that an annular collar, I, on the under side of the platform, placed around the slot in the platform through which the lever C plays, is surrounded by a loose collar, I', to the opposite lugs *i i* of which the bails on the forward end of the drag-bar are pivoted. I prefer this construction, although any other connection may be employed.

In order to vary the number of actions of the gaveling-rake for each revolution of the crown-plate, I form the crown-plate as illustrated in Fig. 3, so that in different horizontal planes different cam-faces will operate upon the roller on the end of the arm C. The lever-arm C may be raised and lowered, as will presently be described, so as to cause the roller *c* to run on either of the cam-surfaces of the crown-plate. Near the upper edge of the crown-plate but one cam-recess, *b*, is shown, as indicated in Fig. 10. On the lower horizontal plane two cam-recesses are provided, as shown in Fig. 9, three on a still lower plane, as indicated in Fig. 8, and four on the lowest horizontal plane, as shown in Fig. 7. The crown-plate may be cast so as to present such cam-faces, or may be made up of four plates, shaped as illustrated in Figs. 7, 8, 9, and 10, and bolted together in proper relation. If the lever C is raised so that the roller *c* runs on the cam-surface indicated in Fig. 10, the gaveling-rake will be thrown into action once in each revolution of the crown-plate. If the roller *c* is adjusted a little lower down, the gaveling-rake will be thrown into action twice, and so it may be three or four times.

I have shown two ways of varying the elevation of the roller *c*, one illustrated in Fig. 3, and the other in Figs. 11 and 12. In Fig. 3 the vertical lever-arm C is pivoted in the end of a lever, $c^2$, pivoted on a bracket or projection, *c*. The free end of the lever $c^2$ may be adjusted up and down, to raise and lower the lever C, by means of a sliding block and slotted plate on the rake-post. In Figs. 11 and 12, instead of the sliding block and slotted plate, the lever $c^2$ may be adjusted by means of a rack upon the post, in the teeth of which a projection on the lever $c^2$ engages. The end of the lever in Fig. 11 is shown as prolonged, so as to form a handle to facilitate its adjustment.

The details of construction herein set forth are practical, and those deemed by me well suited for the purpose; but many of them may obviously be varied without departing from my invention.

The right to hereafter file other applications for any subject-matter herein described or illustrated and not fully claimed is reserved.

I claim as my invention—

1. The combination, substantially as set forth, of the grain-platform, and a rocking gaveling-rake, the rocking rake-head of which is mounted in bearings on the rear inner end of the grain-platform, and projects therefrom horizontally across the path of the machine.

2. The combination of the grain-platform, sweep-rake mechanism, a laterally-projecting gaveling-rake arranged at the inner rear end of the grain-platform, the cam on the crown-plate of the sweep-rake, and connecting mechanism for automatically actuating the gaveling-rake by the cam, substantially as set forth.

3. The combination, substantially as set forth, of a grain-platform, a drag-bar extending to the rear of the grain-platform and connected with the frame of the machine, so as to freely rise and fall, a gaveling-rake carried by the drag-bar, the sweep-rake mechanism, and the cam mechanism and lever-connections for automatically actuating the gaveling-rake.

4. The combination, substantially as set forth, of the grain-platform, a drag-bar connected to the main frame, so as to rise and fall freely at its rear end, a gaveling-rake carried on the rear end of the drag-bar at the rear inner end of the grain-platform, mechanism for automatically actuating the gaveling-rake, and means for elevating the rear end of the drag-bar.

5. The combination, substantially as set forth, of the grain-platform, an independently rising and falling drag-bar secured at its forward end to the grain-platform and extending rearwardly under said platform, a laterally-projecting gaveling-rake carried on the end of the drag-bar, mechanism for raising and lowering the drag-bar relatively to the grain-platform, mechanism for automatically actuating the gaveling-rake, and the coupling-rods or lever-connections between said mechanism and the gaveling-rake.

6. The combination, substantially as set forth, of the grain-platform, the drag-bar secured at its forward end to the platform, so as to rise and fall independently, a shoe on the drag-bar which runs on the surface of the ground, a gaveling-rake carried upon the rear end of the drag-bar, the rake-post, the cam mechanism for actuating the gaveling-rake, and the lever-connections between said mechanism and the rake.

7. The combination, substantially as set forth, of the grain-platform, the rake-post, the crown-plate, its cam surfaces or tracks in different vertical planes, the pivoted lever which is operated upon by such cam-surfaces, a gaveling-rake arranged at the rear of the delivery side of the grain-platform, and mechanism connecting the cam-actuated lever and the gaveling-rake.

In testimony whereof I have hereunto subscribed my name.

SILAS G. RANDALL.

Witnesses:
WM. J. RUSSELL,
J. E. JULIAND.